(12) United States Patent
Mennenga et al.

(10) Patent No.: US 6,477,985 B1
(45) Date of Patent: Nov. 12, 2002

(54) APPARATUS AND METHOD FOR CONVERTING A STOCK TRAILER INTO A HORSE TRAILER

(75) Inventors: Duane G. Mennenga, Meservey, IA (US); Barton L. Saylor, Belmond, IA (US)

(73) Assignee: Ox Bow Manufacturing Equestrian Gates, Belmond, IA (US)

( * ) Notice: Subject to any disclaimer, the term of this patent is extended or adjusted under 35 U.S.C. 154(b) by 10 days.

(21) Appl. No.: 09/649,250

(22) Filed: Aug. 28, 2000

(51) Int. Cl.[7] ............................................. A01K 29/00
(52) U.S. Cl. .................... 119/512; 119/474; 119/513; 119/519; 119/522
(58) Field of Search ................. 119/474, 512, 119/513, 514, 519, 522, 523, 840, 843; 410/117, 118, 121, 126, 127, 129, 130, 131, 150

(56) References Cited

U.S. PATENT DOCUMENTS

| | | | | |
|---|---|---|---|---|
| 238,243 A | * | 3/1881 | Mitchell | 119/415 |
| 3,019,763 A | * | 2/1962 | Ferris | |
| 3,574,388 A | * | 4/1971 | Stone | 280/43.23 |
| 3,741,529 A | * | 6/1973 | Blagg | 256/26 |
| 3,828,733 A | * | 8/1974 | Correia | |
| 3,970,045 A | * | 7/1976 | Graham, Jr. | 119/514 |
| 4,052,098 A | * | 10/1977 | Metz | 410/131 |
| 4,537,151 A | * | 8/1985 | Bolton | 119/512 |
| 4,659,136 A | * | 4/1987 | Martin et al. | 105/377.09 |
| 4,733,899 A | * | 3/1988 | Keys | 160/351 |
| 4,964,768 A | * | 10/1990 | Shomo | 410/121 |
| RE33,959 E | * | 6/1992 | Mollhagen | |
| 5,240,301 A | * | 8/1993 | Arnold | 220/533 |
| 5,427,486 A | * | 6/1995 | Green | 296/24.1 |
| 5,688,087 A | * | 11/1997 | Stapleton et al. | 410/143 |
| 5,887,928 A | * | 3/1999 | Fenske | 296/24.2 |
| 5,924,385 A | * | 7/1999 | Cossel | 119/512 |
| 6,077,007 A | * | 6/2000 | Porter et al. | 410/121 |
| 6,206,624 B1 | * | 3/2001 | Brandenburg | 410/121 |
| 6,283,537 B1 | * | 9/2001 | DeVore, III | 296/181 |

* cited by examiner

Primary Examiner—Yvonne R. Abbott
(74) Attorney, Agent, or Firm—McKee, Voorhees & Sease, P.L.C.

(57) ABSTRACT

An apparatus and method for converting a stock trailer into a horse trailer. Dividers are mounted on the inside of a stock trailer to create separate compartments for a number of horses. When the trailer reaches its destination, the dividers can be removed and used in combination with the stock trailer to create a corral for the horses.

29 Claims, 4 Drawing Sheets

APPARATUS AND METHOD FOR CONVERTING A STOCK TRAILER INTO A HORSE TRAILER

BACKGROUND OF THE INVENTION

A. Field of the Invention

This invention relates to an apparatus and method for converting a stock trailer for use as a horse trailer, and in particular, manipulating the stock trailer conversion apparatus for use as a corral upon reaching a destination.

B. Background of the Invention

Livestock trailers generally are an open space trailer. This means there are no designated compartments for the individual livestock transported in the trailer. While the open space of the trailer is generally not a concern when transporting livestock, there are concerns that arise when one wants to transport a horse via a livestock trailer.

Absent a designated compartment, the transport of horses in a stock trailer becomes extremely hazardous. Without designated compartments, as seen in a standard horse trailer, a horses movement cannot be limited during transportation. A horse's center of mass is elevated compared to other livestock, which increases the it's susceptibility to shifts in the trailer during transportation. These shifts put the horse at risk of becoming unbalanced and falling. Therefore, horses transported in a livestock trailer have a significant increase in their chances for injury, which for horses is always serious and can often result in costly veterinary bills.

Another problem exists if the horses are able to move around during transportation. When a horse is in motion in a trailer a displacement of weight occurs. Because most horses are very heavy animals this displacement can make it very difficult on the person trying to maintain the trailer as a tow vehicle.

A possible solution to the above stated problems is to purchase a horse trailer. The horse trailer will have a designated compartment for the horse which will help eliminate the problems stated above, however, horse trailers can be very expensive. A new horse trailer can cost between 10–50 thousand dollars. Even a used trailer can be expensive costing between 2–40 thousand dollars. Therefore, the purchase of a horse trailer is not often an available solution.

More problems arise when the stock trailer reaches its destination. First, where to keep the horses and second will the horse be safe in the place where it is kept. A horse can be tied to a gate or even the horse trailer itself, however, this can be hazardous to the horse. If the horse is a bit jumpy or becomes spooked, the possibility of injury becomes large. As the horse begins to jump around it may injure itself against the fence or trailer. Therefore, tying the horse to a fence or gate puts the horse's health at risk. This problem is further enhanced by ever increasing veterinary costs.

One solution to the horse's accommodation problems is to create a pen for the horse by tying a number of gates, such as the STRONGHOLD by Hagie Mfg. Co., P.O. Box 273, Clarion, Iowa 50515, to the side of the trailer, thus creating a circular or square corral. Nonetheless, storage and transport of the gates becomes a problem. Most gates are irregular in shape typically 8', 10', and 12' lengths. These lengths can make it very difficult for transport because the gates are longer than most truckbeds and trailers. Furthermore, the gates are made of a heavy metal such as steel. The gates are bulky, heavy and difficult to handle for most people, especially petite women. This makes the building of a temporary corral a overwhelming task.

Another possible solution is to use an electrical fence, such as the SAFE-FENCE by J. L. Williams Co., P.O. Box 209, Meridian, Ind. 83680, to create a makeshift pen. However, most of the electrical fence products are unreliable and do not store very well. Further, not only will containment of the horses fail if the batteries expire, but if a single horse runs through the fence, the rest of the horses would run off also, as the corral would be disabled.

It is therefore a primary objective of the present invention to provide an apparatus and method for converting a stock trailer into a horse trailer.

Further objects, features, and advantages of the present invention include:

allowing the horse to ride better than it would in a stock trailer;

decreasing the horse's movement during travel;

allowing for better displacement of weight in the trailer;

significantly reducing the chance of injury to the horse;

reducing veterinary costs;

providing for a inexpensive solution to buying a horse trailer;

implementing a structure that converts a stock trailer to a horse trailer where the structure can also be used to create a corral;

eliminating dangers connected to tying a horse to a hitching post or to a trailer;

allowing a horse more freedom; and providing lightweight easy to transport gate materials to implement a safe corral.

SUMMARY OF THE INVENTION

An apparatus and method for converting a stock trailer for use as a horse trailer. Dividers are mounted on the inside of a stock trailer to create separate compartments for a number of horses. When the trailer reaches its destination, the dividers can be removed and used in combination with the stock trailer to create a corral for horses.

DETAILED DESCRIPTION OF THE PREFERRED EMBODIMENT

Figure 1:
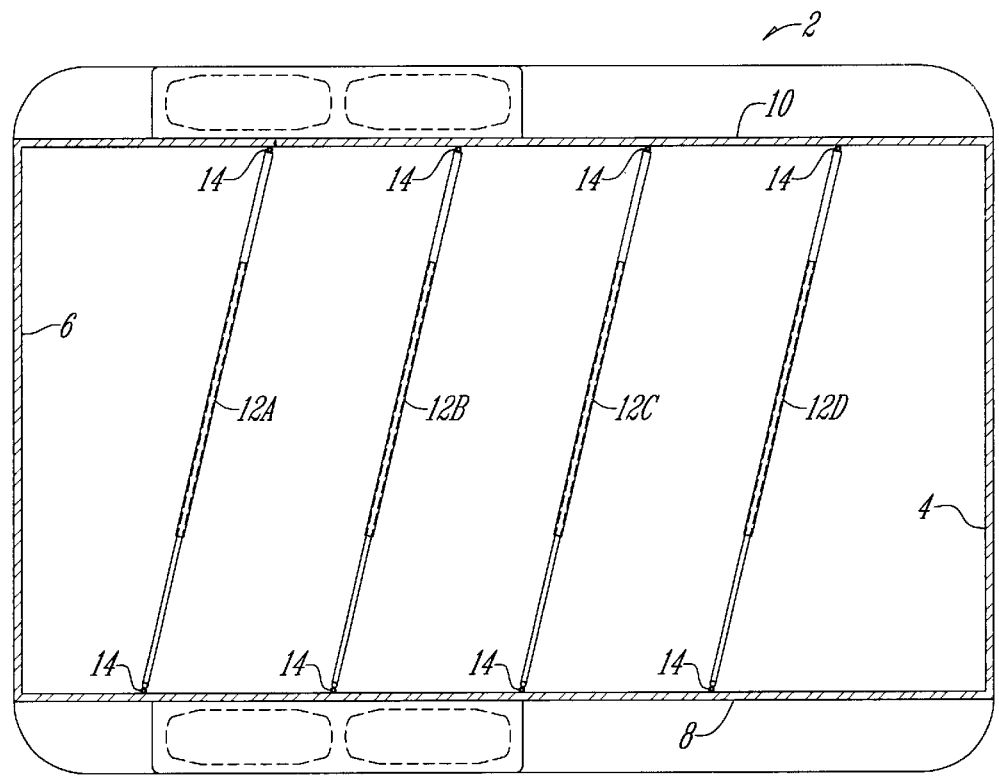
FIG. 1 is an aerial view of the dividers placed in the stock trailer.

The detailed description of a preferred embodiment of the present invention will now be set forth. It is to be understood that this detailed description is intended to aid in an understanding of the invention by discussing specific forms that the invention can take. It does not, nor is it intended to, specifically limit the invention in its broad form.

This detailed description will be made with specific reference to FIGS. 1–7. Reference numerals are used to indicate specific parts or locations in the drawing. The same reference numeral will be used for the same parts or locations throughout the drawings unless otherwise indicated.

Figure 4:
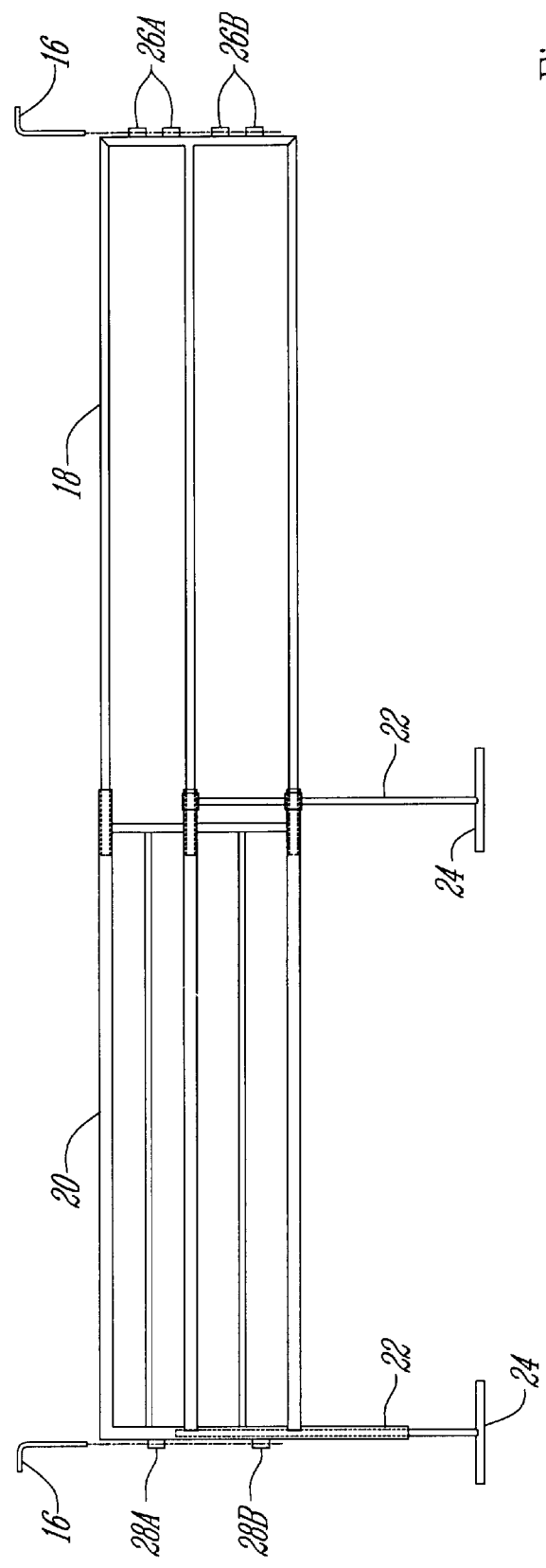
FIG. 4 is a side view of the dividers outside of the trailers.
Figure 5:
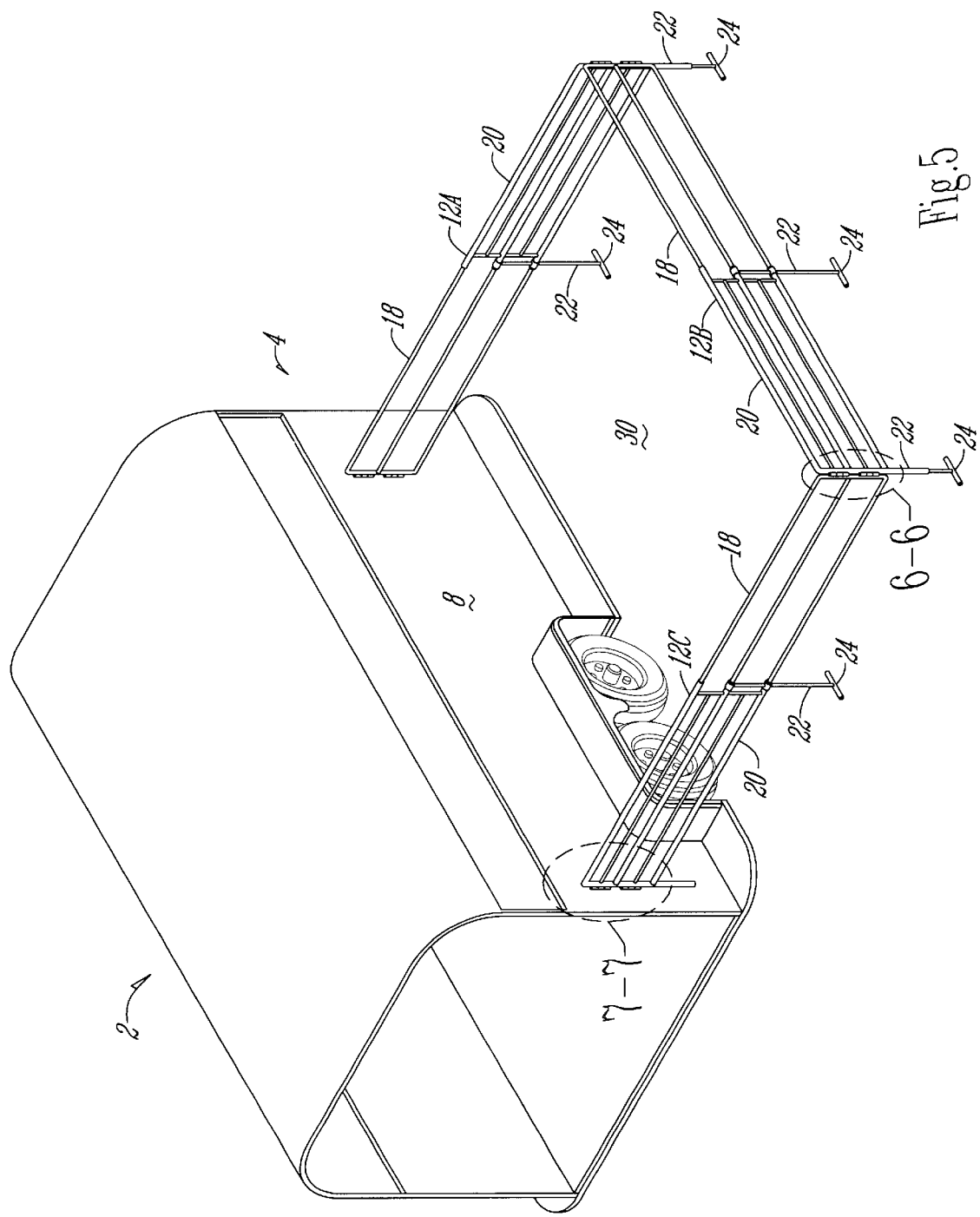
FIG. 5 is a diagram of the combination of the stock trailer and expandable dividers to form a corral.
Figure 6:
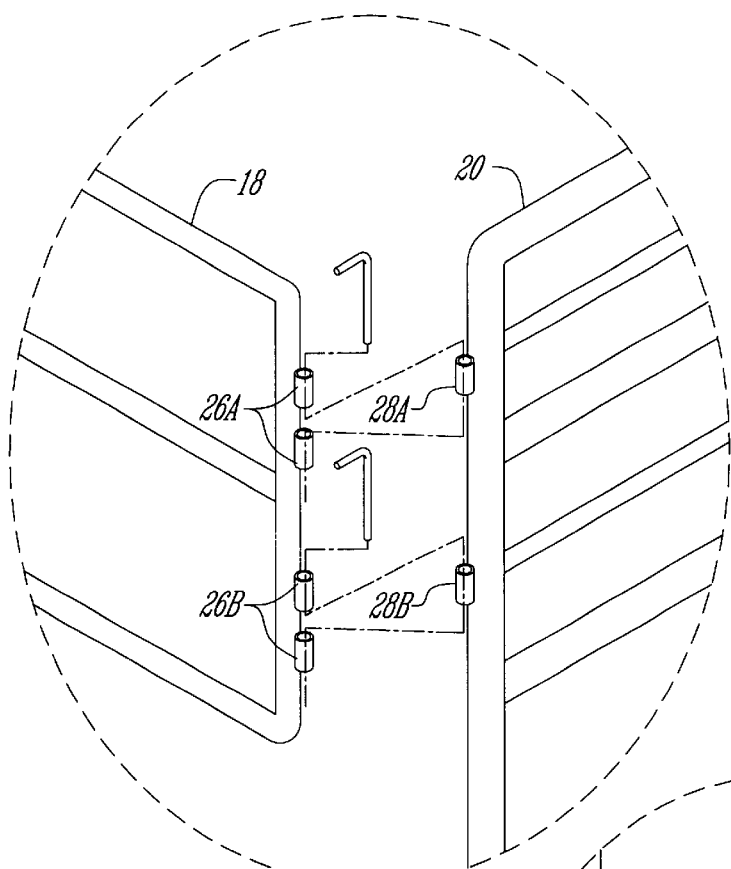
FIG. 6 is a diagrammatic representation of two dividers joined together.

With reference to FIG. 1, a stock trailer 2 is shown comprising a front end 4, a rear end 6, and two opposing side walls 8 and 10, a number of telescopically expandable dividers 12A–D are attached to side walls 8 and 10 by a bearing sleeve 14 and an L-pin 16 (FIG. 6). The divider 12 is comprised of an inner telescopic section 18 connected to an outer telescopic section 20 (FIG. 4). Each telescopic section 18 and 20 has one or two legs 22 that have a tubular telescopic base 24. With reference to FIG. 6 the inner telescopic section 18 has a pair of double bearing sleeves 26 which receive a pair of single bearing sleeves 28 attached to the outer telescopic section 20. The telescopically expandable dividers 12A–D can be used to create a corral 30 (FIG. 5).

The conversion of a stock trailer 2 into a vehicle capable of safely transporting horses can be shown with reference to FIG. 1. First, double bearing sleeves 26 (shown in FIG. 4) are mounted to the inside of side wall 8 and single bearing sleeves 28 (shown in FIG. 4) are mounted to the inside of side wall 10. Next bearing sleeves 28A and 28B located on the side of outer telescopic section 20 of the divider 12 is placed in-between the respective double bearing sleeves 26 on the inside of wall 8 (See FIG. 7). L pin 16 is then run through the center of sleeves 26 and 28 to create swivel joint 14 (See FIG. 7).

Now a horse can be led to front 4 of trailer 2. When the horse is comfortably in stock trailer 2, expandable divider 12D is then swung closed. To secure divider 12D consists of placing double bearing sleeve 26A and 26B (FIG. 4) on the side of inner telescopic portion 18 between respective single bearing sleeves 28 on the inside of wall 10 to create another swivel joint 14. Finally, divider 12D is secured when L pin 16 is put in swivel joint 14. The horse now has a designated compartment inside stock trailer 2. It should be noted that all dividers 12A–D are placed at an angle. This is to create more room for the horse than would be available if dividers 12A–D were placed at right angles to walls 8 and 10.

The steps above can be repeated for as many horses as stock trailer 2 will allow. By implementing these separate compartments for the horses they are able to ride better. This is because the horses ability to move is decreased and thus less movement during travel. Further, because the horse is moving less there is less chance for injury to the horse. Finally, due to the horses being evenly spaced in stock trailer 2 there is a better displacement of weight and thus trailer 2 is easier to control during travel.

Figure 2:
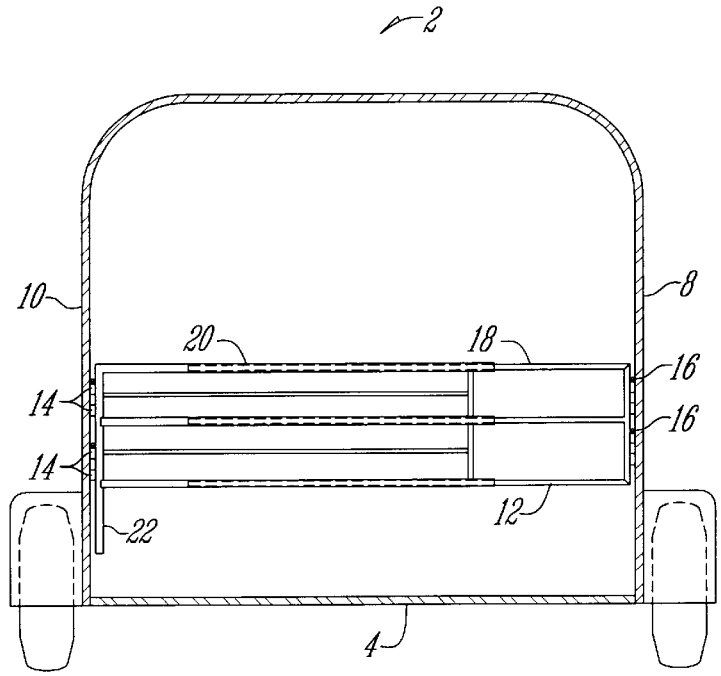
FIG. 2 is a descriptive view of the rear of the stock trailer with dividers installed.

With reference to FIG. 2, one can see how expandable divider 12 is fully contracted to fit within stock trailer 2. Expandable divider 12 contracts to 7'2" from a fully expandable length of either 12' or 18' depending on the size needed. When the operator wants to create stock trailer 2 he merely pushes inner telescopic portion 18 inside outer telescopic portion 20 to create a divider that fits within stock trailer 2. This process is further simplified by the fact dividers 12A–D are made of lightweight aluminum. The lightweight aluminum allows for ease of use for the operator. Further, using lightweight dividers 12A–D gives the operator an inexpensive solution to purchasing a horse trailer.

Figure 3:
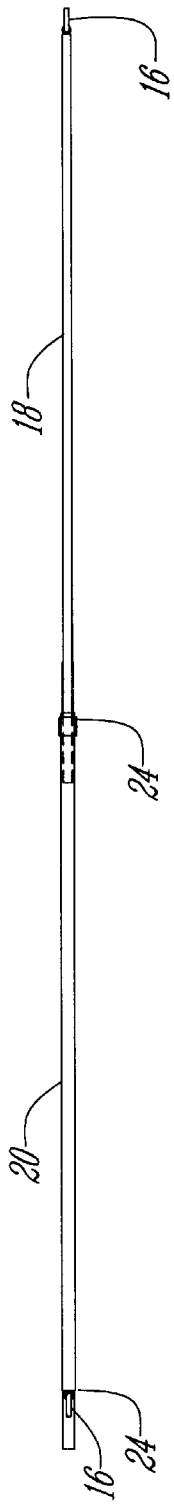
FIG. 3 is an aerial view of the dividers telescopically expanded outside of the trailer.

With reference to FIGS. 3 and 4 divider 12 is shown in a telescopically expanded state. It is this expanded state that allows a user to create corral 30 as seen in FIG. 5. The user would first remove dividers 12A–D from stock trailer 2. Then by expanding each divider 12 by pulling telescopic sections 18/20 apart and placing telescopic legs 24 in their respective leg channels 22 the user now has a piece of lightweight gate that ranges from 12' to 18' long.

Figure 7:
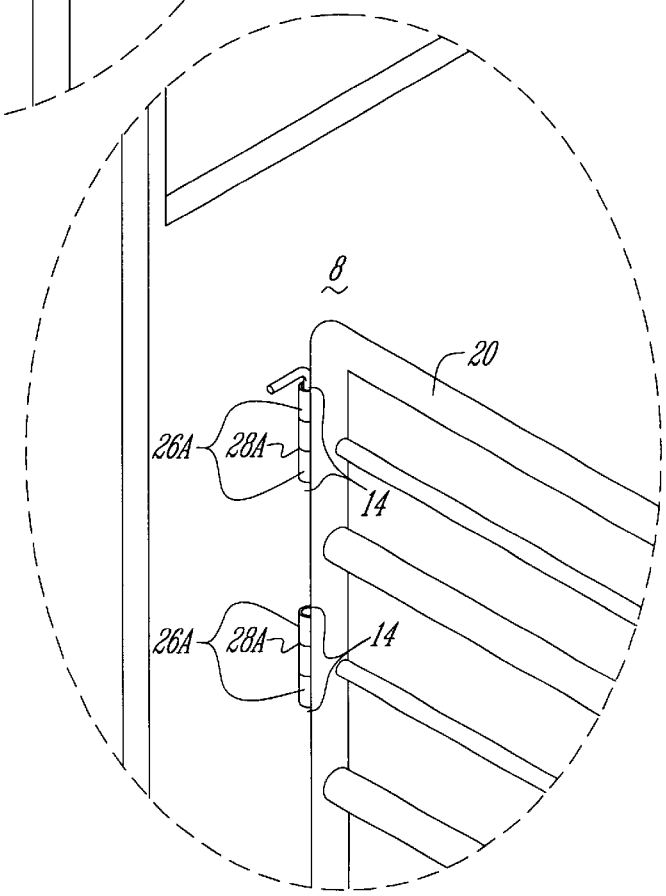
FIG. 7 is a diagram of the interconnection between the divider and the outside of the stock trailer.

With reference to FIGS. 5–7, corral 30 is built with expanded dividers 12A–C. First, the operator places single bearing sleeves 28A and 28B on inner telescopic section 20 in-between double bearing sleeves 26A and 26B located on the outside of side wall 8 near rear wall 6 (FIG. 7). Next the operator places L-pin 16 in swivel joint 14 to secure divider 12C to trailer 2. The remaining dividers 12A–B are then connected in the same form as seen in FIG. 6 until divider 12A is connected to trailer 2. It should be noted that as few as two dividers 12 could be used to create a triangular corral.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

What is claimed is:

1. An apparatus for converting a stock trailer to a horse trailer comprising:
   a divider having first and second sides on opposite ends of a longitudinal axis, the divider having portions telescopically expandable and retractable relative to one another along said longitudinal axis;
   the first side of the divider connectably attachable to an inside wall of a stock trailer;
   the second side of the divider connectably attachable to an opposite inside wall of a stock trailer;
   the divider is removable from the inside of the stock trailer and telescopically expandable wherein the divider can be connectably attached to the outside of the stock trailer and other dividers to create a corral.

2. The apparatus of claim 1 wherein the divider is connectably mountable at an angle to provide for a slant loaded trailer.

3. A method for converting a stock trailer to a horse trailer comprising:
   connecting a first side of a divider to an inside wall of a stock trailer;
   telescopically adjusting portions of the divider;
   connecting a second side of the divider to an opposite wall;
   the divider is removable from the inside of the stock trailer and telescopically expandable wherein the divider can be connectably attached to the outside of the stock trailer and other dividers to create a corral.

4. The method of claim 3 wherein the divider is connectably mountable at an angle to create a slant loaded trailer.

5. An apparatus for use in handling livestock comprising:
   a panel having a top, bottom, and opposite sides, portions of the panel being telescopically adjustable relative to each other along a longitudinal axis between opposite sides;
   each side adapted for releasable connection;
   further in combination with a livestock trailer;
   wherein the panel is releasably removable from the trailer and assemblable outside the trailer as a corral.

6. The apparatus of claim 5 wherein the panel is comprised of tubular members.

7. The apparatus of claim 6 wherein the tubular members are spaced apart.

8. The apparatus of claim 7 wherein the tubular members are aluminum.

9. The apparatus of claim 6 wherein the tubular members are approximately 2' outside diameter.

10. The apparatus of claim 5 wherein the panel is approximately five to eight feet in length along the longitudinal axis in a retracted position.

11. The apparatus of claim 5 wherein the panel is in the range of approximately ten to sixteen feet in length when in a fully expanded position.

12. The apparatus of claim 5 wherein the panel is approximately two feet in height.

13. The apparatus of claim 5 wherein the pane 1 is generally rectangular in shape.

14. The apparatus of claim 5 wherein the panel has at least one downwardly adjustable foot.

15. The apparatus of claim 4 wherein said foot is removable.

16. The apparatus of claim 5 wherein the panel is adjustable between retracted a portion and an expanded position approximately double its retracted length.

17. The apparatus of claim 5 wherein telescoping portions comprise portions nested within one another.

18. The apparatus of claim 5 further comprising releasable connections at opposite sides.

19. The apparatus of claim 18 wherein the releasable connections include hardware for releasable pivotal connection to structural member.

20. The apparatus of claim 19 wherein the hardware comprises a receiver for a pin.

21. The apparatus of claim 20 wherein the releasable connection connects a panel at a side of the panel near the top and bottom.

22. The apparatus of claim 5 wherein the opposite sides of a panel are releasably connected to opposite sides of a trailer.

23. The apparatus of claim 22 wherein the opposite sides of the panel are pinned in place to opposite sides of the trailer.

24. The apparatus of claim 5 wherein at least one panel is attached to a releasable connection on the trailer.

25. The apparatus of claim 5 where a side of two panels is attached to the trailer.

26. The apparatus of claim 5 further comprising a plurality of vertically adjustable feet extending from one or more panels.

27. The apparatus of claim 5 wherein one of said releasable connections between panels assembled as a corral is releasable so that said panel is hingable and usable as a gate.

28. An apparatus for use in handling livestock comprising:
   a panel having a top, bottom, and opposite sides, portions of the panel being telescopically adjustable relative to each other along a longitudinal axis between opposite sides;
   each side adapted for releasable connection;
   a plurality of panels and releasable connections on opposite ends of each panel, the releasable connections connectable to one another to construct a corral using said plurality of panels.

29. A livestock trailer convertible to a horse trailer comprising:
   a trailer having opposite sides, a front, and a back;
   a divider having first and second sides on opposite ends of a longitudinal axis, the divider having portions telescopically expandable and retractable relative to one another along said longitudinal axis;
   releasable connections for connecting a panel to opposite sides of the trailer;
   said panel can be removed from the trailer and releasably connected at one point to the outside of the trailer for creating a corral.

* * * * *